Patented Nov. 30, 1926.

1,608,926

UNITED STATES PATENT OFFICE.

EMIL COLLETT, OF CHRISTIANIA, NORWAY, ASSIGNOR, BY MESNE ASSIGNMENTS, TO ATMOSPHERIC NITROGEN CORPORATION, OF SOLVAY, NEW YORK, A CORPORATION OF NEW YORK.

ART OF PRODUCING AMMONIA SYNTHETICALLY.

No Drawing. Application filed August 17, 1923, Serial No. 657,973, and in Norway August 17, 1922.

In the industrial production of ammonia from the elements by passing a mixture of 3 volumes of hydrogen and 1 volume of nitrogen over a catalyst, it is an important condition to use as a catalyst, one which not only gives a good output of ammonia, but which will also enable this result to be obtained at moderate pressures and temperatures, and which will as far as possible remain unaltered during use and not lose its activity during extended use.

It has been suggested amongst other measures to use as a catalyst mechanical mixtures of iron and oxides of alkaline metals, alkaline earth metals and other substances. These catalysts however produce a comparatively low output of ammonia from the supplied gas mixture even when the pressure is high.

The present invention has for its object to obtain a good ammonia output without the necessity of employing exceedingly high pressures, and it has been found that by use of ferrites and ferrates i. e. metallic salts of oxygen acids of iron, it is possible to a great extent to attain this result.

Such ferrites and ferrates may be produced in a known manner especially from the following elements: calcium, barium, magnesium, copper, manganese. Chemically speaking these compounds will in each case be a metallic salt of oxygen acids of iron, the basic metal of the salts being a metal other than iron and preferably an alkaline earth metal.

The production of such ferrites and ferrates has been described for instance in: Dammer: Handbuch der anorganischen Chemie, year 1893, Vol. 3; Erich Müller: Das Eisen und seine Verbindungen, year 1917.

These ferrites (or ferrates), when used as catalysts for ammonia synthesis, are subjected to heat and contact with a reducing gas, such as nitrogen-hydrogen gas or hydrogen alone (preferably in the ammonia converter in which the catalyst is to be used), until conditions are such that in passing nitrogen-hydrogen gas over or through the catalytic material, the desired regular and continuous formation of synthesized ammonia will result. At this time the material in the converter is apparently a reduction product of the ferrites (or ferrates).

Experiments, which have been made, show that calcium ferrite is particularly suitable for the present object.

To produce contact materials according to the present process one may for instance heat an intimate mixture of 56 parts of caustic lime (CaO) with 160 parts of iron oxide ($Fe_2O_3$) to fusion point, preferably in an electric furnace. By cooling the melt calcium ferrite is obtained as a crystalline mass of a metallic lustre (fusion point about 1200° C.). This mass is crushed into pieces of a suitable size and is treated with a mixture of hydrogen and nitrogen under a pressure of about 90 atmospheres, at 500° C. The catalyst material is reduced and the nitrogen-hydrogen gas mixture passing in contact with the reduction product undergoes synthesis; and in this manner ammonia may be continuously and easily produced with an output, which is many times that obtained according to the prior method mentioned above.

I claim:—

1. In the process of producing ammonia synthetically, that improvement which consists in conducting the synthesis in the presence of a catalyst which consists of the reduction product of a mass having as its dominant constituent a metallic salt of oxygen acids of iron, the basic metal of the salt being a metal other than iron.

2. In the process of producing ammonia synthetically, that improvement which consists in conducting the synthesis in the presence of a catalyst which consists of the reduction product of a mass having as its dominant constituent an alkaline earth salt of oxygen acids of iron.

3. In the process of producing ammonia synthetically, that improvement which consists in conducting the synthesis in the presence of a catalyst which consists of the reduction product of a mass having as its dominant constituent a calcium salt of an oxygen acid of iron.

4. In the process of producing ammonia synthetically, that improvement which consists in conducting the synthesis at pressures below 100 atmospheres and in the presence of a catalyst which is the reduction product of a mass having as its dominant constituent a metallic salt of oxygen acids of iron, the basic metal of the salt being a metal other than iron.

5. In the process of producing ammonia synthetically, that improvement which consists in conducting the synthesis at pressures below 100 atmospheres and in the presence of a catalyst which is a reduction product of a mass having as its dominant constituent an alkaline earth salt of an oxygen acid of iron.

6. In the process of producing ammonia synthetically, that improvement which consists in conducting the synthesis at pressures below 100 atmospheres and in the presence of a catalyst which is the reduction product of a mass having as its dominant constituent a calcium salt of an oxygen acid of iron.

EMIL COLLETT.